United States Patent
Yan

(10) Patent No.: US 7,512,562 B2
(45) Date of Patent: Mar. 31, 2009

(54) METHOD FOR PROCESSING CONDITIONAL PAYMENT REQUEST IN AN ELECTRONIC FINANCIAL TRANSACTION

(75) Inventor: Shunguo Yan, Austin, TX (US)

(73) Assignee: International Business Machines Corporation, Armonk, NY (US)

( * ) Notice: Subject to any disclaimer, the term of this patent is extended or adjusted under 35 U.S.C. 154(b) by 1292 days.

(21) Appl. No.: 10/443,678

(22) Filed: May 22, 2003

(65) Prior Publication Data

US 2004/0236684 A1 Nov. 25, 2004

(51) Int. Cl.
*G06Q 40/00* (2006.01)
(52) U.S. Cl. ............................. 705/38; 710/39; 710/54
(58) Field of Classification Search ............. 705/35–45; 707/1–10, 100–104, 200–206; 710/1–74, 710/100–125, 200–304; 379/1–917; 370/200–545; 719/310–332; 711/1–6, 100–221
See application file for complete search history.

(56) References Cited

U.S. PATENT DOCUMENTS 5,208,748 A 5/1993 Flores et al. ................. 364/419
6,549,957 B1 * 4/2003 Hanson et al. ............... 710/5
2002/0184047 A1 * 12/2002 Plotnick et al. .............. 705/1

FOREIGN PATENT DOCUMENTS

WO  WO 00/55774  9/2000
WO  WO 01/61595  8/2001

OTHER PUBLICATIONS

System Administration Guide iPlanet Trustbase Payment Services Version 2.0 Beta, Sun Microsystems, Jul. 2002.*
Los Angeles Times article Device Clears Credit Card Purchases Correctly, on the Spot, Proponents Say Banking/Finance, Dec. 17, 1987, p. 5.*

* cited by examiner

*Primary Examiner*—Mary Cheung
*Assistant Examiner*—Brian Fertig
(74) *Attorney, Agent, or Firm*—Justin M. Dillon; Winstead P.C.

(57) ABSTRACT

A mechanism is presented for processing conditional payment requests in an electronic financial transaction system. In particular, the mechanism provides for the handling of concurrent conditional payment events. The status of a payment condition may be categorized into three categories, and a priority assigned relative to the category. In this way, concurrent events may be prioritized according to their respective categories. Events may then be executed in order of assigned priority.

8 Claims, 5 Drawing Sheets

| Status | Category | Priority |
|---|---|---|
| Registered | Initial | ---- |
| CDPProcessing | Intermediate | Low |
| Failed | Intermediate | Low |
| Waived | Terminal | High |
| Canceled | Terminal | High |
| Discharged | Terminal | High |
| Expired | Terminal | High |

FIG. 3

METHOD FOR PROCESSING CONDITIONAL PAYMENT REQUEST IN AN ELECTRONIC FINANCIAL TRANSACTION

TECHNICAL FIELD

The present invention relates in general to data processing systems for financial transactions mediated over an Internetwork, and in particular to a data processing system and methods therein for processing conditional payment requests in an electronic financial transaction.

BACKGROUND INFORMATION

The advent of business-to-business (B2B) electronic commerce has led to the development of technologies for the automated payment transactions between buyers and sellers engaged in electronic commerce. In particular, mechanisms have been promulgated for the initiation of payments related to B2B e-commerce transactions using the Internet. One such technology is the Eleanor initiative. Eleanor is a set of specifications for implementing interoperable B2B electronic payment services which may be communicated between the parties using the Internet. Eleanor is promulgated by Identrus LLC, New York, N.Y., and the Eleanor specification may be obtained through it.

In a transaction conducted in accordance with the Eleanor mechanism, transactions are conveyed in messages in accordance with the Eleanor specifications. In any transaction, the entities that may participate are a buyer ("BU"), a seller ("SE"), a seller financial institution ("SFI") and a buyer financial institution ("BFI"). Note that in a transaction, a particular financial institution might be acting on behalf of both the buyer and seller. That is, a particular buyer and seller pair could have the same financial institution. The entity on whose behalf the financial institution is acting may be referred to as the "role" of the institution in any given transaction.

Additionally, transactions may be initiated by either the seller or buyer. If initiated by the buyer, the transaction may, but need not, include securely signed information from the seller. (For the purposes herein, a securely signed information from the seller may be understood to be a digital signature which may be based on a public-key algorithm, and a trusted certification authority; the details of the signing algorithms are not required). Note that the source of a particular message may be any one of entities participating in a transaction, that is a buyer, seller, buyer's financial institution or seller's financial institution, and this may be independent of the initiator of the transaction. The initiator of the transaction may be signified in a message by the "model." If the transaction is initiated by the Seller, the model may be referred to as a seller financial institution model ("SFIM"). Similarly, if the buyer initiated the transaction, the model referred to as the buyer financial institution model ("BFIM"). There may be two submodels of the buyer financial institution model depending on whether the transaction is initiated by the buyer and signed by the seller, the buyer financial institution model with seller signature ("BFIMsig") or, alternatively if unsigned by the seller, the buyer financial institution model without seller's signature. The model may be used, among other things, to allow a financial institution to distinguish the order in which messages must be forwarded between itself, its subscriber, or other financial institutions, or the types and order of the validity checks it must perform. Requests for payment in the BFIM model are usually instructions from a Buyer for the Buyer's financial institution to release money.

These requests may be in the form of payment order from the Buyer requesting the BFI to execute a credit payment to the Seller. In particular, a payment order may be made subject to a condition (conditional payment order) whereby the payment will not be released until the conditions have been met, or waived.

The payment condition may be in any of several status. For example, in the Eleanor Specification, discussed hereinabove, there are seven condition status: Registered, CDPProcessing, Cancelled, Waived, Discharged, Expired and Failed. Different parties, for example, buyers and condition discharging parties can concurrently access a payment system and submit requests which may trigger condition status transitions. (A condition discharging party may be a party that, for a particular conditional payment, may discharge the condition, that is, "inform" the payment system that the particular condition has been met. The condition discharging party may be, but is not necessarily, the buyer.) The buyer may submit a cancel request to transition the status to cancelled status. If, for example, these two events occur substantially concurrently, the operating system will select one to execute, and the other will wait until the first change in status is complete. The subsequent execution of the second event may fail because of the change in status due to the execution of the first. This may present a performance bottleneck to the payment system.

Therefore, there is a need the art for mechanisms to prioritize the processing of conditional payment requests in an electronic payment system.

SUMMARY OF THE INVENTION

The aforementioned needs are addressed by the present invention. Accordingly, there is provided in one embodiment, a computer program product embodied in a tangible storage medium. The program product includes programming for processing concurrent conditional payment events. The program instructions are executable to perform the operation of enqueueing the concurrent conditional payment events in a queue according to a predetermined priority policy. An enqueued conditional payment event having a first priority position in the queue is executed and the remaining conditional payment events having a same priority from the queue are deleted. Conditional payment events constitute a predetermined set of requests for performing a corresponding action on a conditioned payment in an electronic transaction system. In a further invention, the step of deleting remaining events in the queue is bypassed if the execution of the conditional payment event having a first priority position fails.

The foregoing has outlined rather broadly the features and technical advantages of the present invention in order that the detailed description of the invention that follows may be better understood. Additional features and advantages of the invention will be described hereinafter which form the subject of the claims of the invention.

BRIEF DESCRIPTION OF THE DRAWINGS

For a more complete understanding of the present invention, and the advantages thereof, reference is now made to the following descriptions taken in conjunction with the accompanying drawings, in which:

FIG. 3 illustrates a priority table which may be used in conjunction with the methodology of FIG. 2;

DETAILED DESCRIPTION

Figure 1:
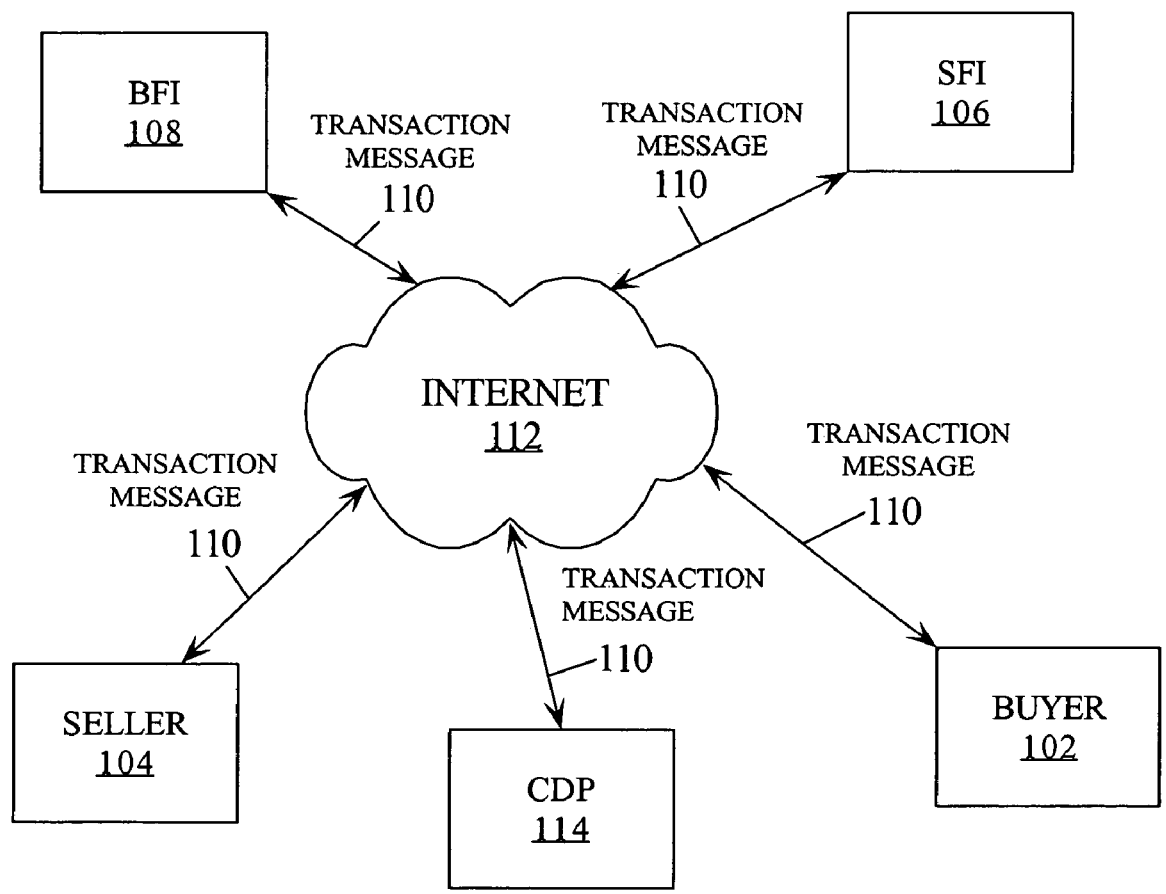
FIG. 1 schematically illustrates an Internet-based e-commerce architecture which may be used in conjunction with the present invention.

A mechanism is presented for processing conditional payment requests in an electronic financial transaction system. In particular, the mechanism provides for the handling of concurrent conditional payment events. The status of a payment condition may be categorized into three categories, and a priority assigned relative to the category. In this way, concurrent events may be prioritized according to their respective categories. Events may then be executed in order of assigned priority.

In the following description, numerous specific details are set forth such as particular communication protocols, etc., to provide a thorough understanding of the present invention. However, it will be recognized by those of ordinary skill in the art that the present invention may be practiced without such specific details. In other instances, well-known circuits have been shown in block diagram form in order not to obscure the present invention in unnecessary detail. For the most part, details concerning timing considerations and the like have been omitted inasmuch as such details are not necessary to obtain a complete understanding of the present invention and are within the skills of persons of ordinary skill in the relevant art. Refer now to the drawings wherein depicted elements are not necessarily shown to scale and wherein like or similar views are designated by the same reference numeral through the several views.

An architecture for Internetworked B2B e-commerce transactions which may be used in conjunction with the present invention is schematically illustrated in FIG. 1. As previously discussed, the set of participants in a particular transaction may include a buyer 102, seller 104, seller's financial institution ("SFI") 106 and a buyer's financial institution ("BFI") 108. A transaction between a buyer and a seller and the initiation of a payment therefore may be effected electronically by an exchange of payment transactions messages 110 (or simply "messages") between the parties. Additionally, as discussed hereinabove, payments may be conditioned on the occurrence of an event, say an insurance policy has been issued, for example. The event may be performed by a third party (e.g. insurance underwriter) which may discharge the condition electronically (the Condition Discharging Party ("CDP")). Thus, a CDP 114 may also exchange payment transaction messages respecting conditional payment events. Messages may contain data in accordance with a predetermined specification to insure interoperability, such as the Eleanor specification. The data may further be encapsulated in accordance with a transport protocol to facilitate the transfer of the data over a network such as Internet 112. Standardized protocols include the Transmission Control Protocol/Internet Protocol (TCP/IP) suite. Those of ordinary skill in the relevant art would appreciate that the particular network transfer protocol used to transfer the encapsulated transaction information is independent of the nature of the encapsulated data itself that is governed by the particular electronic payment system specifications and vice versa.

Figure 2:
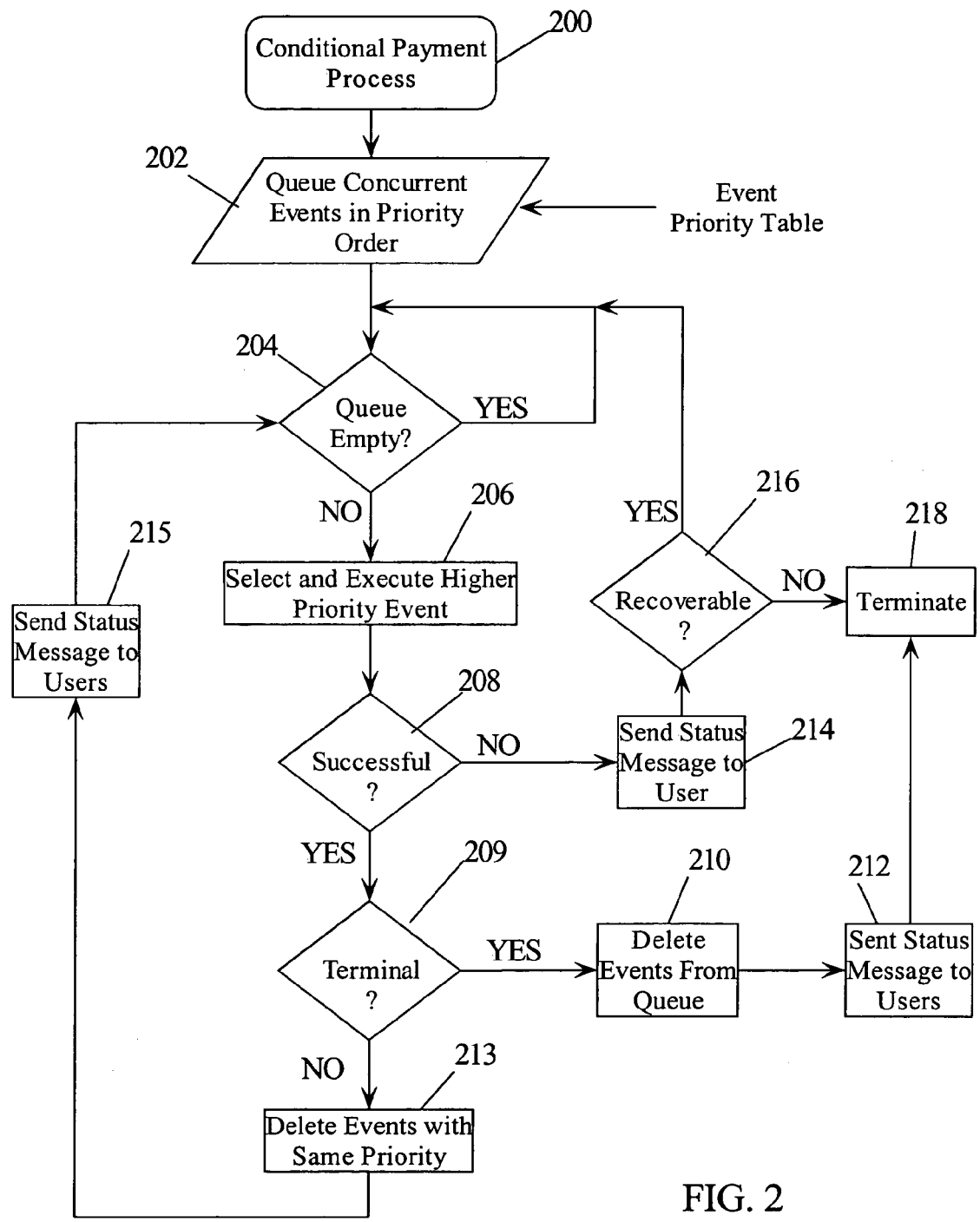
FIG. 2 illustrates, in flowchart form, a methodology for conditional payment processing in accordance with an embodiment of the present invention.

Refer now to FIG. 2 illustrating, in flowchart form, a process 200 for processing concurrent conditional payment events in accordance with an embodiment of the present invention. Process 200 may, for example, be performed by a BFI's electronic transaction system. The flowcharts provided herein are not necessarily indicative of the serialization of operations being performed in an embodiment of the present invention. Steps disclosed within these flowcharts may be performed in parallel. The flowcharts are indicative of those considerations that may be performed to produce the operations available to process conditional payment requests. It is further noted that the order presented is illustrative and does not necessarily imply that the steps must be performed in the order shown.

Conditional payment status may be categorized into three categories: initial, intermediate and terminal. Initial status may be the start status of a payment condition, assigned automatically when a payment request is first registered to the system. An initial status may be changed to either intermediate status or terminal status by a request (equivalently, event), depending on the request type. A payment condition in an intermediate status may be further changed to terminal status. The status of a payment condition having terminal status may not be changed into any other status. Events that trigger a status transition, if occurring concurrently, are not necessarily of the same significance in the payment system. In step 202, concurrent events (for a particular conditional payment transaction) are queued in a priority order.

A prioritization scheme which may be used in conjunction with process 200 is illustrated in the priority table in FIG. 3. The CDPProcessing status and the Failed status are in the intermediate category. "CDPProcessing status", in accordance with the aforementioned Eleanor specification may indicate that the CDP has accepted the particular payment condition. "Failed" status may indicate that the CDP has not accepted or cannot fulfill the condition. These statuses may be assigned "low" priority. "Waived" status, "Canceled" status, "Discharged" status and "Expired" status are in the terminal category, and may be assigned "high" priority. "Waived" status may indicate that the paying party has waived the condition. The "Waived" status "tells" the payment system to ignore the condition. "Canceled" status indicates that the payment transaction itself has been cancelled by the buyer.

"Discharged" status indicates that the payment condition has been satisfied, and "Expired" indicated that the time for fulfilling the payment condition has lapsed without the condition being fulfilled. A methodology for enqueueing concurrent events will be described in conjunction with FIG. 4.

Returning to FIG. 2 in step 204, process 200 waits, if the priority queue is empty. Otherwise, in step 206, the highest priority event, that is, the event at the "top" of the queue, is removed from the queue and executed, step 206.

If the selected event executes successfully, step 208, if the event is a terminal event, step 209, the remaining events are deleted from the queue, in step 210. In step 212, status messages are sent to the respective user, and process 200 terminates, step 218. Process 200 may similarly operate to process any other conditions in the payment request. If, in step 209, the executed event is not a terminal event, events having the same priority are deleted from the queue, step 213. (As discussed below, a concurrent event may be added to the queue during execution of the current event.) In step 214, status messages are returned to the respective users, and process 200 returns to step 204.

If the execution of the selected event fails, step 208, in step 214 a status message is sent to the user. If the failure is recoverable, step 216, process 200 returns to step 204. Otherwise, process 200 terminates with respect to the current payment condition. Process 200 may similarly operate to process any other payment conditions.

Figure 4:
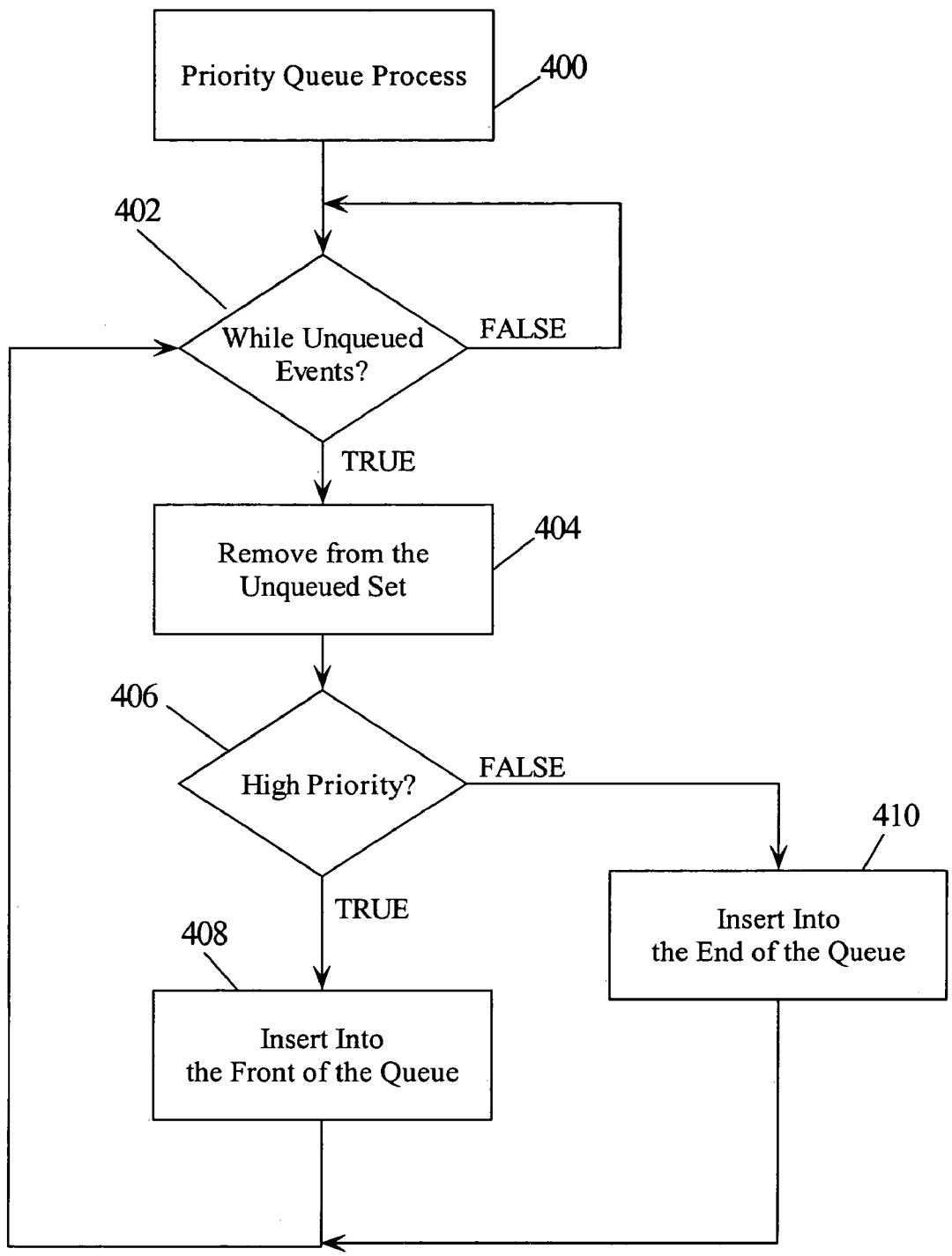
FIG. 4 illustrates, in flowchart form, a methodology for populating a priority queue in accordance with the present inventive principles.

Refer now to FIG. 4, illustrating in flowchart form, a process 400 for populating a priority queue, which may be used to perform the operation of step 202, FIG. 2. Note that process 400 may be performed in parallel with process 200; in particular, concurrent events may be added to the queue during the execution of an event. For example, process 400 may be a separate thread continuously receiving events and enqueueing them. However, it would be appreciated by those of ordinary skill in the art that process 400 may be implemented as a separate process with interprocess communication (IPC) between process 200, FIG. 2, and process 400 for communicating data and actions between the two processes. It would be further recognized that commonly-employed IPC mechanisms, such as pipes, may be used in conjunction with the present inventive principles.

In step 402, the process enters a loop to enqueue concurrent conditional payment events. Note that, because event execution may take some duration of time, involving for example a database access and queue access, the set of unqueued events may change dynamically during enqueueing and event execution. All such events received during this time may be considered concurrent events. While there are unqueued events, step 402, an event is randomly selected and removed from a list of unqueued events in step 404. If the event has high priority, step 406, in accordance with a predetermined priority, such as the priorities defined in the priority table in FIG. 3, the selected event is inserted into the front of the queue, step 408, and process 400 returns to step 402. Otherwise the event is inserted into the end of the queue as a low priority event, step 410, and process 400 returns to step 402. Any remaining events are enqueued by repeating steps 404-410.

Otherwise, in step 402, if there are no unqueued events, process 400 loops until there is a new event. If there is a new event, the process breaks out of the loop in step 402 and repeats the steps discussed above.

Process 400 in conjunction with a set of priorities such as the priority table of FIG. 3 may be said to form a priority policy. It would be appreciated by those of ordinary skill in the art that other priority policies may be used in conjunction with the present inventive principles and such priority policies would fall within the spirit and scope of the present invention.

Figure 5:
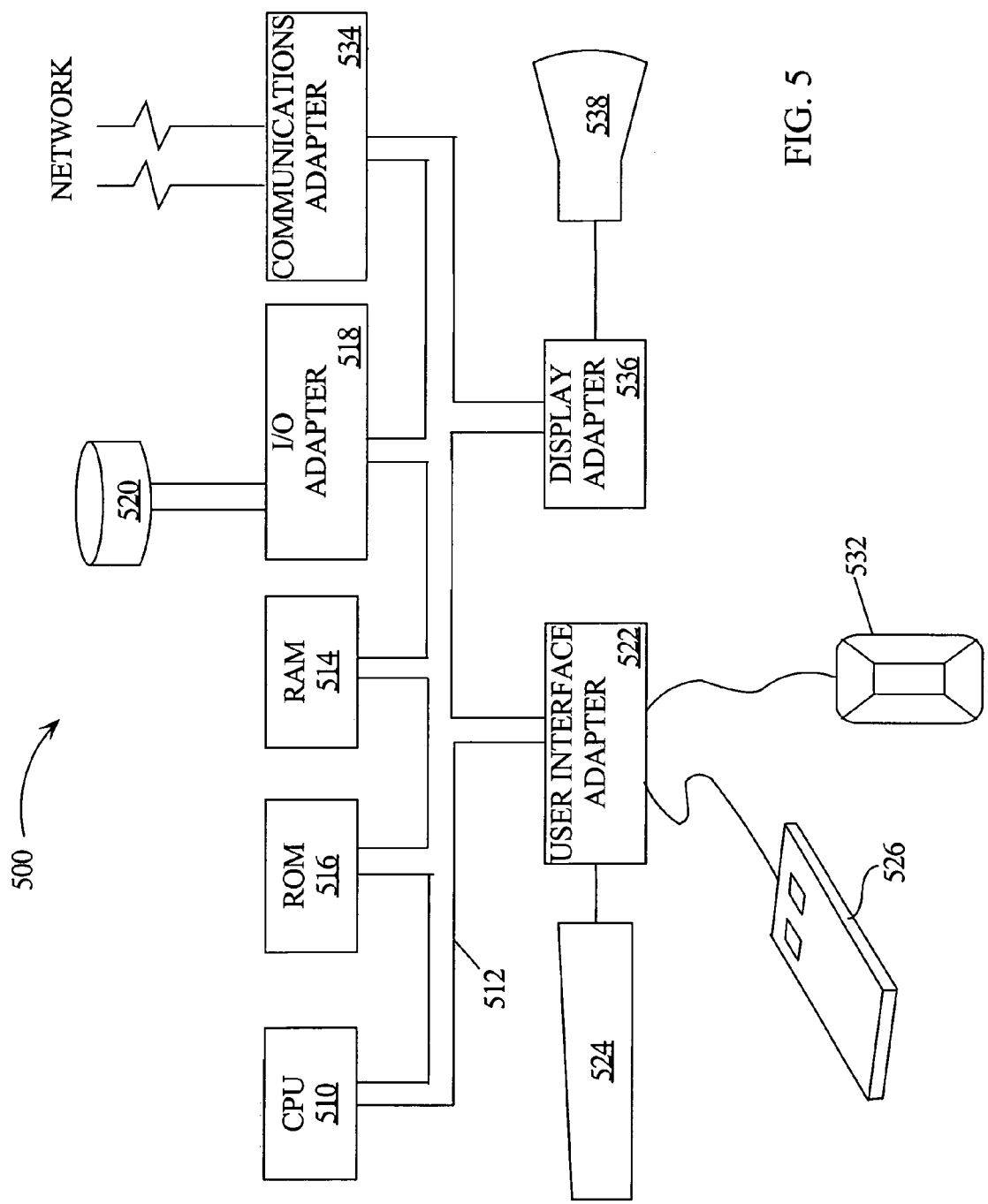
FIG. 5 illustrates, in block diagram form, a data processing system which may be used in an embodiment of the present invention.

FIG. 5 illustrates an exemplary hardware configuration of data processing system 500 in accordance with the subject invention. The system in conjunction with the methodologies illustrated in FIGS. 2-4 may be used for processing conditional payment requests in accordance with the present inventive principles. Data processing system 500 includes central processing unit (CPU) 510, such as a conventional microprocessor, and a number of other units interconnected via system bus 512. Data processing system 500 also includes random access memory (RAM) 514, read only memory (ROM) 516 and input/output (I/O) adapter 518 for connecting peripheral devices such as disk units 520 to bus 512, user interface adapter 522 for connecting keyboard 524, mouse 526, trackball 532 and/or other user interface devices such as a touch screen device (not shown) to bus 512. System 500 also includes communication adapter 534 for connecting data processing system 500 to a data processing network, enabling the system to communicate with other systems, and display adapter 536 for connecting bus 512 to display device 538. CPU 510 may include other circuitry not shown herein, which will include circuitry commonly found within a microprocessor, e.g. execution units, bus interface units, arithmetic logic units, etc. CPU 510 may also reside on a single integrated circuit.

Preferred implementations of the invention include implementations as a computer system programmed to execute the method or methods described herein, and as a computer program product. According to the computer system implementation, sets of instructions for executing the method or methods are resident in the random access memory 514 of one or more computer systems configured generally as described above. These sets of instructions, in conjunction with system components that execute them may process conditional payment events in an electronic transaction system as described hereinabove. Until required by the computer system, the set of instructions may be stored as a computer program product in another computer memory, for example, in disk drive 520 (which may include a removable memory such as an optical disk or floppy disk for eventual use in the disk drive 520). Further, the computer program product can also be stored at another computer and transmitted to the users work station by a network or by an external network such as the Internet. One skilled in the art would appreciate that the physical storage of the sets of instructions physically changes the medium upon which is the stored so that the medium carries computer readable information. The change may be electrical, magnetic, chemical, biological, or some other physical change. While it is convenient to describe the invention in terms of instructions, symbols, characters, or the like, the reader should remember that all of these in similar terms should be associated with the appropriate physical elements.

Note that the invention may describe terms such as comparing, validating, selecting, identifying, or other terms that could be associated with a human operator. However, for at least a number of the operations described herein which form part of at least one of the embodiments, no action by a human operator is desirable. The operations described are, in large part, machine operations processing electrical signals to generate other electrical signals.

Although the present invention and its advantages have been described in detail, it should be understood that various changes, substitutions and alterations can be made herein without departing from the spirit and scope of the invention as defined by the appended claims.

What is claimed is:

1. A method for processing concurrent conditional payment events comprising:

enqueueing, in a computer, said concurrent conditional payment events in a queue according to a predetermined priority policy;

executing, in a computer, an enqueued conditional payment event having a first priority in said queue; wherein said enqueued conditional payment event having a first priority in said queue is executed if said queue is not empty; and deleting, in a computer, remaining conditional payment events with a same priority of said executed conditional payment event from said queue, wherein conditional payment events comprise a predetermined set of requests for performing a corresponding action on a conditioned payment in an electronic transaction system;

wherein said step of deleting said remaining conditional payment events is bypassed if the executed conditional payment event fails.

2. The method of claim 1 wherein said conditional payment events trigger a change in status of a conditional payment in said electronic transaction system.

3. The method of claim 1 wherein said policy comprises enqueueing each conditional payment event having a same priority in accordance with a random selection.

4. The method of claim 3 wherein conditional payment events having a first priority are enqueued before conditional payment events having a second priority, wherein said first priority is higher than said second priority.

5. The method of claim 2 wherein the status of a conditional payment comprises one of a predetermined set of statuses.

6. The method of claim 5 wherein the predetermined set of statuses of a conditional payment comprises the group including: Registered, CDPProcessing, Failed, Waived, Canceled, Discharged and Expired.

7. The method of claim 5 wherein a first subset of the predetermined set of statuses comprises an intermediate category of statuses, and a second subset of the predetermined set of statuses comprises a terminal category of statuses.

8. The method of claim 7 wherein said policy comprises the intermediate category having a first priority and the terminal category having a second priority, wherein said first priority is lower than said second priority.

* * * * *